United States Patent
Coburn et al.

(10) Patent No.: US 8,533,479 B2
(45) Date of Patent: *Sep. 10, 2013

(54) TRANSLATING INFORMATION BETWEEN COMPUTING DEVICES HAVING DIFFERENT SECURITY MANAGEMENT

(75) Inventors: Max N. Coburn, Seattle, WA (US); Yen Luong Huynh, Sammamish, WA (US)

(73) Assignee: Liaison Technologies, Inc., Alpharetta, GA (US)

( * ) Notice: Subject to any disclaimer, the term of this patent is extended or adjusted under 35 U.S.C. 154(b) by 409 days.

This patent is subject to a terminal disclaimer.

(21) Appl. No.: 12/790,723

(22) Filed: May 28, 2010

(65) Prior Publication Data

US 2011/0145584 A1    Jun. 16, 2011

Related U.S. Application Data

(63) Continuation-in-part of application No. 10/994,921, filed on Nov. 22, 2004, now Pat. No. 7,730,298.

(51) Int. Cl.
*H04L 9/32*    (2006.01)

(52) U.S. Cl.
USPC ........... 713/176; 713/153; 713/155; 713/180; 380/28

(58) Field of Classification Search
USPC .................... 713/176, 153, 155, 180; 380/28
See application file for complete search history.

(56) References Cited

U.S. PATENT DOCUMENTS

| | | | | |
|---|---|---|---|---|
| 6,185,683 | B1 * | 2/2001 | Ginter et al. | 713/176 |
| 6,308,277 | B1 * | 10/2001 | Vaeth et al. | 726/10 |
| 6,725,373 | B2 * | 4/2004 | Carbajal et al. | 713/179 |
| 6,748,538 | B1 * | 6/2004 | Chan et al. | 726/26 |
| 7,159,240 | B2 * | 1/2007 | England et al. | 726/6 |
| 7,478,243 | B2 * | 1/2009 | Bolosky et al. | 713/181 |
| 7,526,645 | B2 * | 4/2009 | Miyazaki et al. | 713/167 |

* cited by examiner

*Primary Examiner* — Amare F Tabor
(74) *Attorney, Agent, or Firm* — FisherBroyles, LLP

(57) ABSTRACT

A system and method for communicating a document between multiple locations is disclosed. A computing device receives, via a network, multiple portions of a document signed and/or encrypted at a first location in accordance with a first signing and encryption methodology along with a trailer manifest specifying an order the portions need to be assembled to reconstruct the document. Each of the portions and the manifest is individually decrypted and validated using the first signing and/or encrypting methodology. The portions and manifest are re-signed and/or re-encrypted with a second signing and encryption methodology such that the information can be decrypted, the signatures can be validated and the document can be reassembled at a second location.

19 Claims, 7 Drawing Sheets

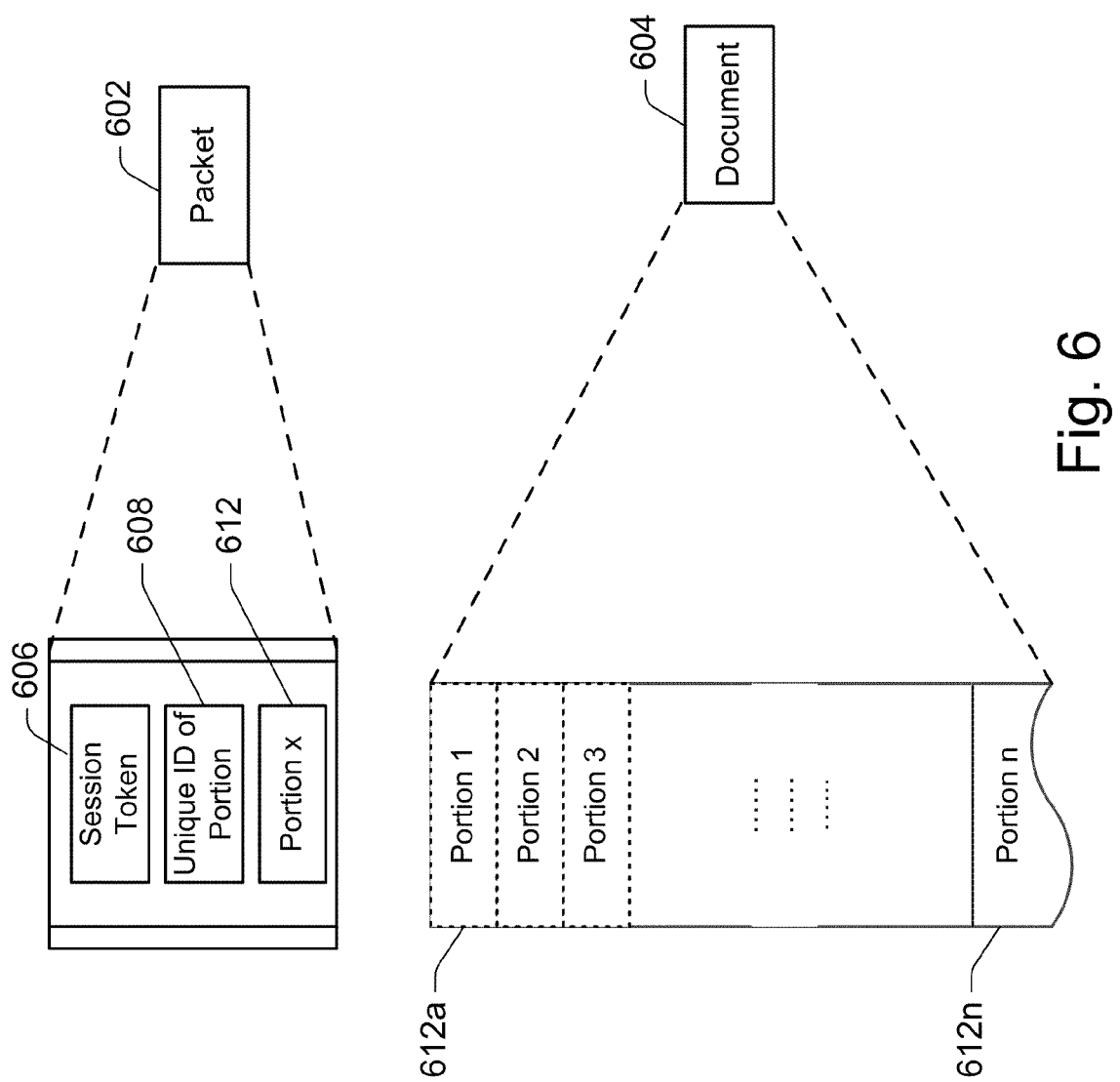

```
<Manifest>
  <SessionToken>13dbb0c8aa05101a9bb000aa002fc45a</SessionToken>
  <PacketInformation>
    <Packet uniqueIDOfPortion="73e0b6b08508ba43941e47b2adf858fa" assemblyOrder="1" />
    <Packet uniqueIDOfPortion="85030200000000c0000000000000046" assemblyOrder="2" />
    <Packet uniqueIDOfPortion="8e183e689c592042916a16279076ed4c" assemblyOrder="3" />
    <!-- more packets ... 
    <Packet uniqueIDOfPortion="99abb13114778a204291790763393eabd" assemblyOrder="n" />
  </PacketInformation>
  <OriginalDocumentHash algorithm="sha1"
   value="524f5a3f1b13114778a2da35d63337744b12010d1" />
</Manifest>
```

TRANSLATING INFORMATION BETWEEN COMPUTING DEVICES HAVING DIFFERENT SECURITY MANAGEMENT

This patent application claims the benefit of U.S. patent application Ser. No. 10/994,921, filed Nov. 22, 2004.

FIELD OF THE INVENTION

These claimed embodiments relate to the field of translating and partitioning documents containing secure information when such documents are being transferred between multiple computing devices.

BACKGROUND

A method and apparatus for translating portions of documents containing secured information between computing devices is disclosed.

Communicating with computers, such as those of financial institutions or any entity transferring secure information, requires that to transmit documents from one computer to another, certain security measures are present. Example of such secure documents include text documents in a word processing format, PDF documents, graphics document or a photograph of a document. For example, the document being sent must be signed and encrypted in accordance with the rules of the corporation. Further, the protocol to transfer the file must be authenticated per the corporation's specifications.

When one corporation needs to transfer information to another corporation having different authentication and encryption requirements, one corporation must change its authentication methodology. Alternatively, one of the corporations may be required to adopt a special authentication methodology to enable communication. These changes can significantly increase the cost to the institution as it typically has specific authentication and encryption methods as part of its infrastructure.

Further often these secure documents may be very large. Consequently if transmission of the secure documents is interrupted, retransmission of the entire document may be required thereby reducing the efficiency of the transmission.

SUMMARY OF THE INVENTION

A method and apparatus for transferring documents with an intermediate computing device coupled between a first computing device disposed at a first location and a second computing device disposed at a second location is disclosed. The method and device includes partitioning the document into portions with the first computing device and then individually signing and encrypting in accordance with a first signing and a first encryption methodology each of the portions. The multiple portions are separately and individually transmitted as data packets along with a trailer manifest via a network from the first computing device to an intermediate computing device where the individual packets are decrypted and the signatures of the packets are verified using the first signing and encrypting methodology.

In one implementation, the trailer manifest will be signed and encrypted by the first computing device. The trailer manifest includes information indicating an order to assemble the portions at a destination computing device and may include a hash of the entire document. The data packets are re-signed and re-encrypted by the intermediate computing device with a second signing and a second encryption methodology/algorithm such that the individual packets can be decrypted and validated at a second location.

These methodologies/algorithms may be previously provided to the intermediate device from a computing device at the second location. The re-signed and re-encrypted individual packets along with the trailer manifest are transmitted separately and individually to the second computing device via a network for decryption and validation so that the second computing device can decrypt and verify the packets and separate the portions from the packets. In another implementation, the individual packets can be transmitted out of order because the trailer manifest will include sufficient information for the receiving computing device (e.g. an intermediate or $2^{nd}$ computing device) to reassemble the document correctly.

The manifest may be provided from the first computing device to the second computing device so that the portions at the second computing device may then be aggregated into the document in a specific order using information contained in the manifest. Also the intermediate computing device may validate the integrity of the aggregated document by first computing a hash value of the aggregated document using the hash algorithm indicated inside the manifest. The intermediate computing device may then compare the computed hash value against the hash value contained in the manifest.

In one implementation a trailer manifest is always provided to the intermediate computing device. The intermediate computing device may decide to re-assemble the document or the intermediate computing device could also transmit the re-signed and re-encrypted packet individually to the second computing device followed by a newly signed and encrypted trailer manifest.

In another implementation, if the intermediate computing device is re-assembling the packet, then the intermediate computing device must validate the aggregated document using the hash provided in the trailer manifest. However, if the intermediate computing device is not re-assembling the packet, it will simply pass the trailer manifest "as is" to the second computing device.

In a further implementation, the intermediate computing device decides whether or not to re-assemble or not to re-assemble the packets using pre-determined data or by analyzing data provided by the first computing device when the first computing device connects and authenticates its data with the intermediate computing device

DESCRIPTION OF THE FIGURES

FIG. 3 is a method executed using a first computing device shown in the translation communications system, where FIG. 4 is the method executed using an intermediate computing device shown in the communications system and where FIG. 5 is the method executed using a second or host computing device shown in the communications system.

FIG. 6 is a data diagram illustrating the contents of document and of a data packet.

FIG. 7 is a data diagram illustrating an exemplary trailer manifest.

DESCRIPTION OF THE PREFERRED EMBODIMENTS

Figure 1:
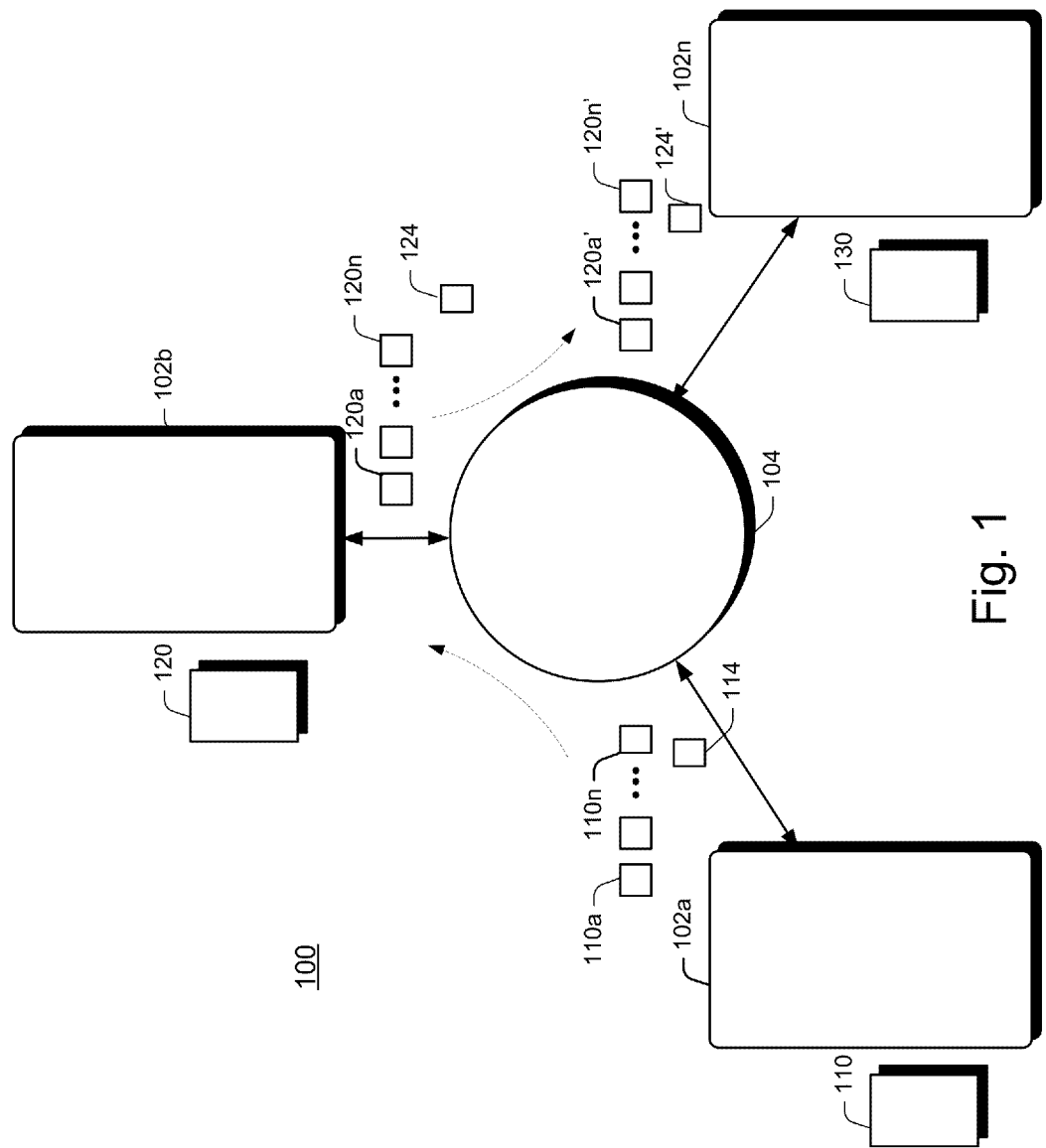
FIG. 1 is a simplified schematic diagram of a communication system for transferring information between computing devices.

Referring to FIG. 1, there is shown system 100 having a first electronic device or first computing device 102a at a first location coupled via network 104 and intermediate computing device 102b to host or second computing device 102n. Computing devices 102b and 102n are preferably located remotely from each other and computing device 102a. First computing device 102a, intermediate computing device 102b and second computing device 102n may be constructed using materials, processes and techniques generally known in the art, and may include conventional components. An example of one of computing devices 102a-102n (Device 200) is described in more detail in FIG. 2.

Computing devices 102a-102n may communicate with each other via an ISO (International Standard Organization), ITU (International Telecommunications Union) or IEEE (Institute for Electrical and Electronic Engineers) standards based network 104 or any proprietary network using structures, protocols and layouts including but not limited to TCP, Ethernet, cellular, microwave, fiber, broadband, baseband, wireless, IEEE 802.11, etc. Network 104 may be an Internet, World Wide Web, intranet, or any combination thereof. Although system 100 is shown with computing device 102b being coupled to computing devices 102a and 102n, computing device 102b may be coupled with many other computing devices (not shown), or coupled via network 104 to other computer networks.

Computing device 102a communicates with an intermediate computing device 102b coupled with a first computing device 102a disposed at a first location and a second computing device 102n disposed at a second location. A document 110 is provided to computing device 102a from a user (e.g. the document may be generated on the computing device) or from another computing device (not shown).

Although a document is specifically mentioned in describing the preferred embodiments, it is contemplated that document may include one or more documents, any type of information, including text, algorithms, audio/video data, symbolic, animation, financial and numerical information. The document may various formats including, but not limited to, Microsoft® Word, PDF, TIFF, GIFF, Visio, Excel, Word-Perfect, and JPEG file formats. Such document is typically transferred to device 102a using generally accepted methods, such as being transferred via an I/O device or being transferred from other computing devices (not shown) coupled to network 104 using Hyper Text transfer protocols (HTTP), FTP (File Transfer Protocol), or using any generally known protocol. The document 110 may be partitioned and split into portions and inserted into data packets 110a-110n having equal size or unequal size depending on networking requirements by computing device 102a.

Computing device 102a individually signs and encrypts each of the packets at the first location in accordance with a first signing and a first encryption methodology. The first computing device 102a may create a trailer manifest 114 for each document. The trailer manifest 114 may contain information indicating a unique ID for each of the multiple portions of the document, a table or listing containing all the unique IDs indicating an order in which the packets or portions of the packets are to be re-assembled, a hash value corresponding to the portion and a hash algorithm of the entire received document to validate the integrity of the document post assembly.

Computing device 102a transmits 1) the individually signed and encrypted multiple packets that each includes a portion of the document and 2) trailer manifest 114, to the intermediate computing device 102b via network 104. Such multiple data packets 110 may be transmitted on the same channel, in any order or may be transmitted over different channels via network 104. The trailer manifest 114 may or may not be encrypted and/or signed before being transmitted to the intermediate computing device 102b.

Intermediate computing device 102b receives via network 104 multiple data packets 110a-n and the trailer manifest 114 from the first computing device 102a. Intermediate computing device 102b decrypts the individual packets and verifies the signatures of the individual portions of the document using the first signing and encrypting methodology. Computing device 102b may be provided keys and the hash algorithm to decrypt, verify and examine the trailer manifest 114 to verify the integrity of the trailer manifest. In another implementation, the computing device 102b may not be provided the trailer manifest keys and hash algorithm but simply passes the manifests through to computing device 102n. Computing device 102b may aggregate the decrypted and verified packets 120.

In one implementation, computing device 102b may aggregate the received portions of the verified document in an order specified in the trailer manifest 114. In another implementation, computing device 102b does not aggregate the packets/portions of the document and passes them through to another computing device. In another implementation, device 102b re-signs and re-encrypts individual data packets 120 with a second signing and a second encryption methodology such that the individual packets can be decrypted and validated at a second location by computing device 102n. Computing device 102b transmits the re-signed and re-encrypted individual packets 120a-120n to the second computing device 102n via a network 104. In one implementation, computing device 102b feeds the received trailer manifest 124 to computing device 102n. In another implementation, computing device 102b generates the trailer manifest 124 for the decrypted, assembled and verified document before transmitting the document to computing device 102n. In another implementation the second signing and encryption methodology/algorithm is provided to computing device 102b by computing device 102n prior to receipt of the packets from computing device 102a. The methodology/algorithms may be stored in a table in the memory of computing device 102b.

Computing device 102n receives via network 104 multiple packets 120a'-120n' from the intermediate computing device 102b and the trailer manifest. Computing device 102n decrypts the packets 120a'-120n' and verifies the signatures of the individual packets using the second signing and encrypting methodology. Computing device 102n may be provided keys and the hash algorithm to examine the trailer manifest 124' to verify the integrity of the multiple packets received from computing device 102b. Computing device 102n then removes the portions of the document from each of the decrypted and verified packets, and aggregates the decrypted and validated portions to form document 130. In one implementation, the order in which the validated portions of the document are assembled/aggregated by device 102n to form the document is specified in the received trailer manifest 120n'.

Example Computing Device Architecture

Figure 2:
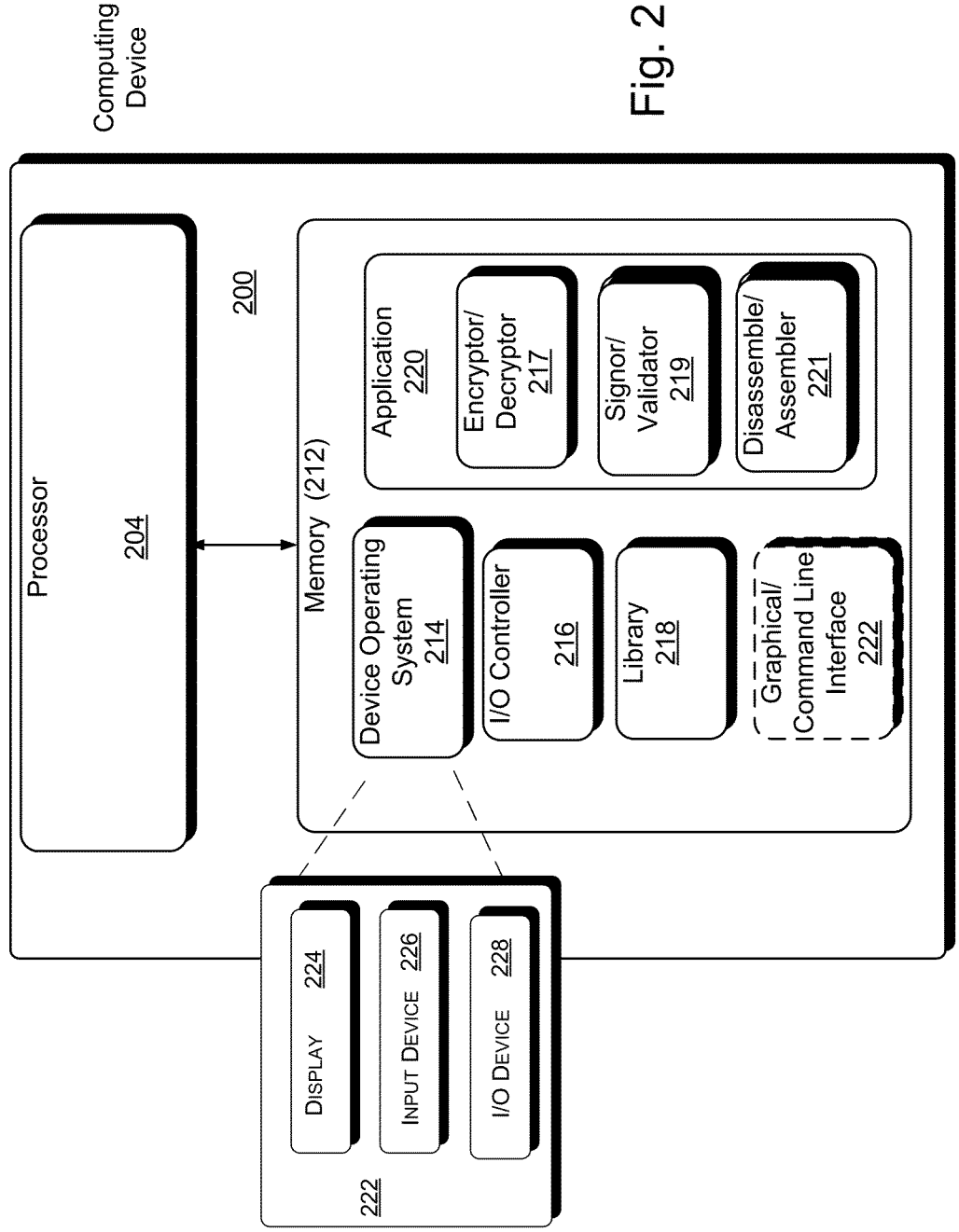
FIG. 2 is a simplified schematic diagram of an exemplary computing device used in the communications system.
Figure 3:
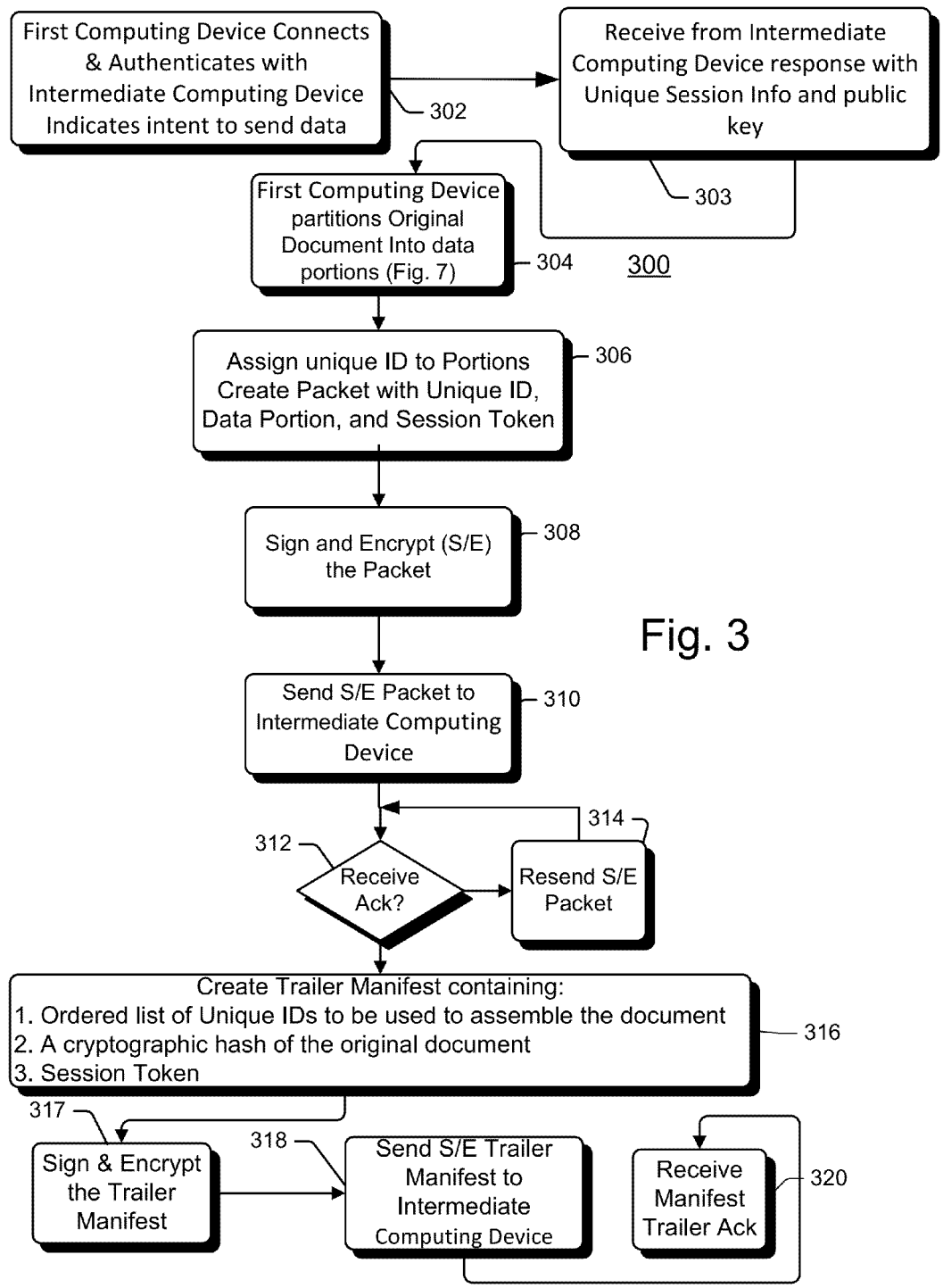
FIGS. 3-5 are flow charts disclosing a method for transferring secure documents between multiple computing devices, where
Figure 4:
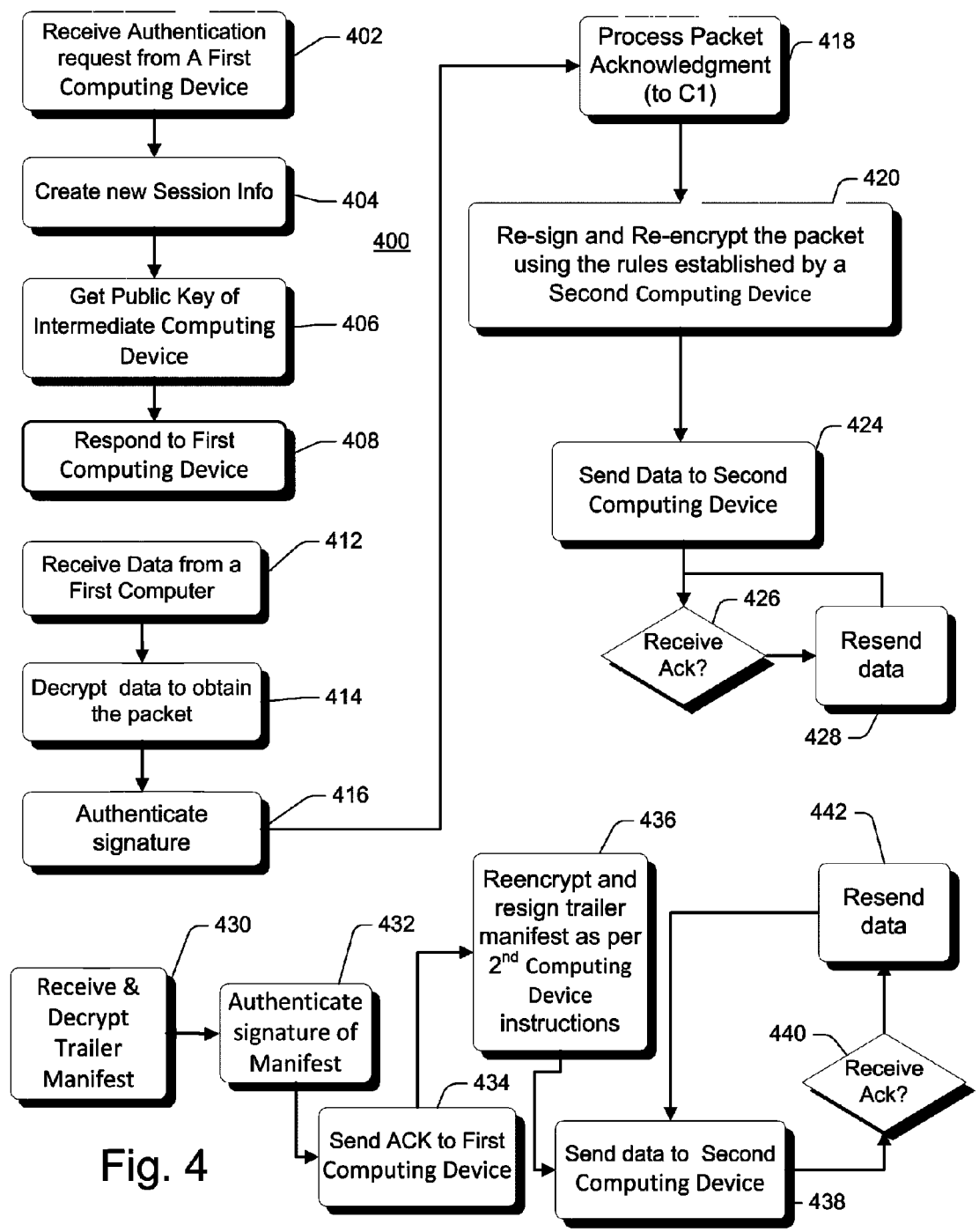
Figure 5:
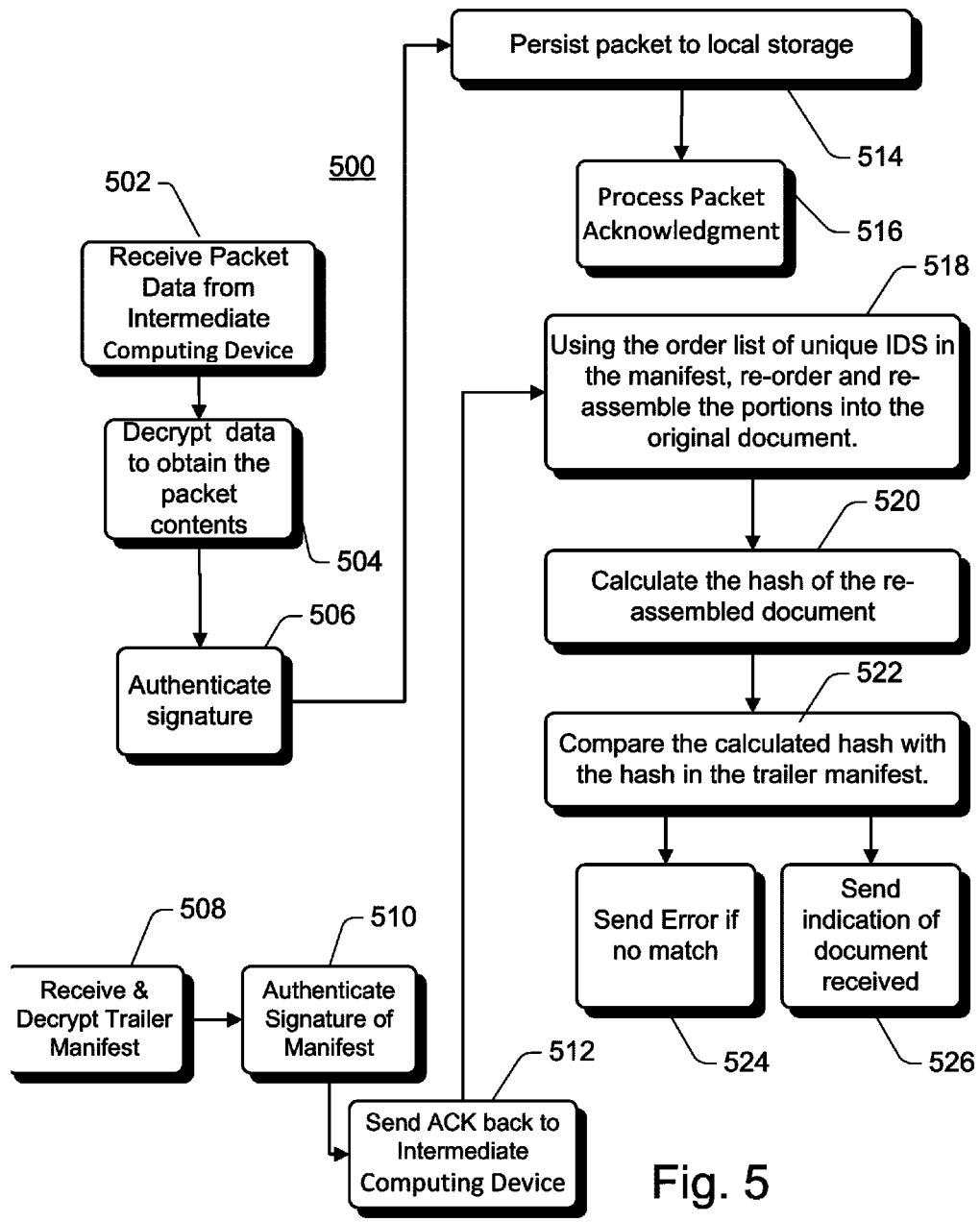

In FIG. 2 are illustrated selected modules in computing device 200 (Devices 102a-102n of FIG. 1) using processes 300, 400 and 500 shown in FIGS. 3-5 respectively. Computing device 200 includes a processing device 204 and memory 212, and hardware 222. Computing device 200 may include one or more a microprocessors, microcontrollers or any such devices for accessing memory 212 or hardware 222. Computing device 200 has processing capabilities and memory suitable to store and execute computer-executable instructions.

Computing device 200 executes instruction stored in memory 212, and in response thereto, processes signals from hardware 222. Hardware 222 may include a display 224, and input device 226 and an I/O communications device 228. I/O communications device 228 may include a network and communication circuitry for communicating with network 104.

Input device 226 receives inputs from a user of the computing device 200 and may include a keyboard, mouse, track pad, microphone, audio input device, video input device, or touch screen display. Display device 224 may include an LED, LCD, CRT or any type of display device to enable the user to preview information being stored or processed by computing device 204.

Memory 212 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 212 of the computing device 200 may include an operating system 214, a communications system application 220 and a library of other applications or database 216. Operating system 214 may be used by application 220 to control hardware and various software components within computing device 200. The operating system 214 may include drivers for device 200 to communicate with I/O communications device 228. A database or library 218 may include preconfigured parameters (or set by the user before or after initial operation) such a server operating parameters, server libraries, HTML libraries, API's and configurations. An optional graphic user interface or command line interface 222 may be provided to enable application 220 to communicate with display 224.

Application 220 includes an encryptor/decryptor module 217, a signor/validator module 219 and an assembler/disassembler module 221. Encryptor/decryptor module 217 separately encrypts (and in some instances re-encrypts) and decrypts the individual portions (data packets) of the documents using encryption methodologies. Signor/validator module 219 separately verifies and signs (and in some instances re-signs) the signatures of the individual portions (data packets) of the document or the entire document using the signing/hashing methodologies and/or algorithms. Assembler/disassembler module 221 separates documents into portions, assigns a unique ID and session ID to the portions, and provides the IDs to generate a trailer manifest indicating the order of the packets. The assembler/disassembler module 221 allows aggregates/assembles portions into a document using the unique ID and session ID provided in the trailer manifest. Specifically the assembler/disassembler module 221 uses the session ID provided in the trailer manifest to determine the order the portions are aggregated to construct a document.

Application processes are described in FIGS. 3-5. Such exemplary processes 300, 400 and 500 may be a collection of blocks in a logical flow diagram, which represents a sequence of operations that can be implemented in hardware, software, and a combination thereof. In the context of software, the blocks may represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Referring to FIG. 3, a flowchart of process 300 executed by a communications application 220 (See FIG. 2) (hereafter also referred to as "application 220") is show. In one implementation, process 300 is executed in a computing device, such as first computing device 102a (FIG. 1). Application 220, when executed by the processing devices, uses the processor 204 and modules 212-228 shown in FIG. 2.

In block 302, application 220 in computing device 102a connects to and authenticates with intermediate computing device 102b to establish a session. To establish the session, computing device 102a provides intermediate computing device 102b with data routing information (i.e. computing device 102a wants to send data to computing device 102n).

In block 303, computing device 102a receives a response from intermediate computing device 102b indicating unique session information (e.g. a session token) and indicating a public key to be used by computing device 102a for encryption of data. The session information may be used by computing device 102a to bind computing device 102a to another computing device, such as computing device 102n, during a data transfer session.

In bock 304, computing device 102a, using module 217 partitions the original document into data portions.

In block 306, computing device 102a assigns a unique ID to each data portion of the document, then envelopes (aggregates) the unique ID, the data portion, and session token to form individual packets 110a-110n.

In block 308, the individual packets are then signed by module 219 and encrypted by module 217 in computing device 102a before being fed as a 'signed/encrypted' data packet to Intermediate Computing device 102b. A configured key pair that is used to encrypt data packets for the document may be retrieved from memory 212 to sign/encrypt the packets.

Application module 219 signs each of the individual data packets and creates an ID for each of the data packets and encrypts each of the individual data packets. The individual packets for the document may be signed by computing device 102a using generally known signing digest algorithms, including but not limited to, MD5 hashing algorithm, SHA-1 hashing algorithm, Elliptic Curve Digital Signature Algorithm (ECDSA). Further details of MD5 and SHA-1 digest algorithms are disclosed in IETF RFC 2014, which is hereby incorporated by reference. Further details of ECDSA are disclosed in IETF RFC 3278, which is hereby incorporated by reference. If the data packets are signed, the keys used to sign the packets may have been previously provided to computing device 102a and stored in memory 212.

Signer certificates may contain public keys that correspond to the private keys used during signing may be embedded in the signed document or signed packets. The signed packets may be formatted with an encoding scheme including but not limited to standard cryptographic message syntax (CMS). The process for signing and CMS formatting is described in IETF RFC 3852, which is hereby incorporated by reference.

When signer certificates are embedded in the document or packets during signing, the signer certificates may not need to be pre-exchanged with computing device 102a-n as discussed herein. Otherwise, signer certificates used to sign the document or data packets must be pre-exchanged between computing devices 102a and 102b (and 102n), so that device 102b can ascertain which certificates to use when verifying the signatures of the documents or data packets.

The signed document or packets may be encrypted by encryptor/decryptor module 217 using standard encryption algorithms using previously provided public keys stored in memory of computing device 102a. Examples of encryption algorithms include but are not limited to Triple DES, AES-128, AES-192, AES-256, CAST128, CAST256, RC2-40, and RC2-128.

The public keys used by computing device 102a to encrypt the packets of the data packets are known to computing device 102b since computing device 102b has the corresponding private keys, which enables computing device 102b to decrypt the data packets. In one implementation, a list of algorithms to be used by computing device 102a may be provided by computing device 102b. The encrypted data packets may be formatted with an encoding scheme including but not limited to standard CMS. The encryption and CMS formatting process is described in IETF RFC 3852, which is hereby incorporated by reference.

In block 310, each of the individual signed/encrypted data packets 110a-110n are transmitted to the intermediate computing device 102b. In some implementations, a signature for each of the data packets is encrypted and transmitted with its respective individual data packet to computing device 102b. The wire protocol for transferring of the encrypted and/or signed document can be any generally known protocol including but not limited to HTTP, FTP or SMTP (EMAIL). Details of such protocols are described in HTTP 1.1, HTTP1.0, FTP, FTPS, SFTP and SMTP (EMAIL), which are hereby incorporated by reference.

The cryptographic message syntax scheme defines the manner in which the data packets are signed and encrypted, encrypted and not signed, or signed and not encrypted, the encryption algorithms and key lengths, the signing digest algorithms, signers' information and signer certificates embedment information. Although the packets may be signed or encrypted, signing and encrypting of each and every one of the packets are optional and some of the packets transferred to computing device 102b may contain any cryptographic message syntax encoding schemes including not being signed and/or encrypted.

In block 312, a determination is made whether an acknowledgment signal has been received from computing device 102b indicating all the individual encrypted data packets have been received. If the acknowledgment is not received within a predetermined time period after transmission, the packets are resent in block 314. If the acknowledgment is received, the trailer manifest 114 is created in block 316 (as previously described in FIG. 1). The trailer manifest includes one or more of a session token, a cryptographic hash of the original document, and an ordered list of all unique IDs for each of the packets. The 'order' defines the order of the portions in relation to the original document and may not necessarily reflect the actual order that the packets were sent by device 102a or received by computing device 102b or 102n.

In block 317, computing device 102a signs and encrypts the trailer manifest using one or more of the algorithms previously described.

In block 318 application 220, using OS 214 and I/O controller 216, sends the manifest to intermediate computing device 102b. The trailer manifest 114 (which may or may not be encrypted and/or signed) is then transmitted to computing device 102b via network 104.

In block 320, a determination is made whether an acknowledgment signal has been received from computing device 102b indicating the trailer manifest has been received. The process 300 then repeats in block 302.

Referring to FIG. 4, a flowchart of process 400 executed by a communications application 220 (hereafter also referred to as application 220) in computing device 102b is shown. In one implementation, process 400 is executed in computing devices 102b (See FIG. 1) although process 400 may be executed by any of computing devices 102a-102n. Application 220 when executed by a computing device uses the processor 204 and modules 212-228 shown in FIG. 2.

In block 402, the application 220 in computing device 102b receives an authentication request from a computing device, such as computing device 102a (FIG. 1).

In block 404, when the request to authenticate from computing device 102a is received, intermediate computing device 102b creates a session token (also referred to as "session information") and returns the token along with the public key of the intermediate computing device 102b to Computing device 102a. The session token is used by intermediate computing device 102b to determine that computing device 102a is trying to send data to computing device 102n. Intermediate computing device 102b needs to store this information so that when the packets arrive from computing device 102a, Intermediate computing device 102b knows the computing device to be routed the data packets.

In block 406, intermediate computing device 102b retrieves its public key, and responds to the first computing device 102a in block 408.

In block 412, application 220 in intermediate computing device 102b receives from computing device 102a one or more data packets that comprise the document. The data packets are received via network 104 from one of the computing devices (e.g. device 102a).

In block 414, application 220 decrypts the received data packets using the one or more private keys presorted in memory of intermediate computing device 102b. The received encrypted data packet (if encrypted) may be decrypted using the same cryptographic algorithm used to encrypt the data packet by computing device 102a. Preferably the decryption algorithm may be indicated by metadata in CMS format included with the received packet or the algorithm may be previously known by the computing device. Intermediate computing device 102b decrypts and verifies the received data packet to obtain the information contained in the packet (e.g. the Session token, unique IDs of the data portion and the data portion itself).

In block 416, computing device authenticates/validates the signatures of the decrypted packet (if the data packet was signed). The signatures may be validated using the embedded certificates or certificates containing the public keys provided by computing device 102a, or a trusted certificate issuing authority. The certificates containing the public keys used in validating the signatures may also be checked against one or more Certificate Revocation Lists (CRL). Details of CRL and its format are described in IETF RFC2459, which is hereby incorporated by reference. Alternatively, the certificates may also be verified using Online Certificate Status Protocol (OCSP) against its issuing Certificate Authority. Details of OCSP are described in IETF RFC2560, which is hereby incorporated by reference.

If the certificates are still valid and the data packet has valid signatures, the data packets may be stored in memory, and intermediate computing device may transmit a process packet acknowledgement indication to computing device 102a in block 418. If the packet is determined not to be valid, or contains invalid certificates, an error may be transferred to computing device 102a and an indication of such error may be logged into memory 18b within computing device. Such error indication may be provided to another computing device on the network 104 or signaled to a user using conventional means.

After authenticating the signature of the data packet, in block 418, application 220 may transmit the process packet acknowledgment indication via network 104 to the computing device that sent the data packet (e.g. device 102a).

In block 420, using the session token received in the data packet, application 220 determines which computing device (e.g. computing device 102n) is to receive this data packet. Intermediate computing device 102b retrieves the necessary information from its memory to re-encrypt and re-sign the data packet.

Once the validated data packets are stored in memory of the computing device 102b, the data packets could be in the clear, and contain no signing or encryption (after block 416). Intermediate computing device 102b retrieves the necessary pre-stored information from its memory to re-encrypt and to re-sign the clear data packets. These clear data packets may be processed (by being re-encrypted and re-signed), in block 420 using process 300 (FIG. 3).

Using the information indicating the computing device destined to receive the packets, the intermediate computing device (e.g. computing device 102b) prepares and transmits the re-signed and re-encrypted data packets to a second computing device (e.g. computing device 102n) in block 424.

The signing digest algorithms, signer certificates embedding process and encoding scheme format used during re-signing in block 420 by computing device 102b may be a different process/algorithm than the process/algorithm that were originally used by computing device 102a.

The data packets may optionally be re-encrypted using standard encryption algorithms. Examples of such encryption algorithms include but are not limited to Triple DES, AES-128, AES-192, AES-256, CAST128, RC2-40, and RC2-128. The public keys used by computing device 102b to encrypt the packets may be known to computing device 102n since device 102n has the corresponding private keys, which enable computing device 102n to decrypt the document. The encrypted packets may be formatted with an encoding scheme including but not limited to standard CMS. The encryption and CMS formatting process is described in IETF RFC 3852, which is hereby incorporated by reference.

In block 426, intermediate computing device 102b determines if an acknowledgement has been received from computing device 102n. The acknowledgement indicates that the data packets were received at computing device 102n as expected and alternatively may provide an indication of the specific data packets that were successfully received at computing device 102n. If an acknowledgement is received the process ends.

In block 428, if the acknowledgement was not received within a predetermined time period or an indication of non-receipt of the data packets is received from computing device 102n, intermediate computing device 102b resends the data packet to computing device 102n. Transmission retries of the data packets may need to occur as necessary during failed transmissions.

After all the data packets are received from computing device 102a and processed, intermediate computing device 102b receives a trailer manifest from computing device 102a.

In block 430, the application 220, receives the trailer manifest received from computing device 102a and decrypts the manifest if it was encrypted (with module 217 using the decryption method previously described).

In block 432, the application 220 using signor/validator module 219 authenticates the signature of the trailer manifest (if the manifest was signed).

Upon authentication of the trailer manifest signature, in block 434, application 220 transmits an indication of trailer manifest acknowledgement via network 104 back to computing device 102a (the sender of the trailer manifest).

In block 436, the session information/token may be examined to determine the computing device destined to receive this manifest. Intermediate computing device 102b also retrieves from its memory the necessary information to re-encrypt and re-sign the manifest.

In block 438, intermediate computing device 102b sends the signed/encrypted manifest to the determined computing device destined to receive the manifest (e.g. computing device 102n).

In block 440, intermediate computing device 102b determines if an acknowledgement has been received from computing device 102n. The acknowledgement indicates that the trailer manifest was received at computing device 102n as expected. If an acknowledgement is received the process ends.

In block 442, if the acknowledgement was not received within a predetermined time period or an indication of non-receipt of the trailer manifest is received from computing device 102n, intermediate computing device 102b resends the signed and/or encrypted manifest to computing device 102n. Transmission retries may need to occur as necessary during failed transmissions.

The re-signed and/or re-encrypted data packets and trailer manifest are received by a second computing device (e.g. computing device 102n). Computing device 102n may then execute blocks 502-526 shown in process 500 of FIG. 5.

In block 502, second computing device 102n (also referred to as host or server computing device) receives data packets from the intermediate computing device 102b via network 104.

When a signed/encrypted data packet arrives from intermediate computing device 102b, computing device 102n decrypts and verifies/authenticates the packet (which contains the session token, unique IDs of the data portions and the data portion itself) in blocks 504 and 506, respectively, using encryptor/decryptor module 217 and signor/validator module 219 (See FIG. 2). Generally, the received encrypted data packets (if encrypted) may be decrypted by computing device 102n using the same algorithm used to encrypt the data packets by computing device 102b. Preferably the decryption algorithm is indicated by metadata in the CMS format included with the received data packets or the algorithm may be previously known by computing device 102n.

Computing device 102n may validate the signature of the decrypted data packets (if signed) with module 219. The signatures may be validated using the embedded certificates or certificates containing the public keys provided by computing device 102b, or a trusted certificate issuing authority. The certificates containing the public keys used in validating the signatures may also be checked against one or more Certificate Revocation Lists (CRL). Details of CRL and its format are described in IETF RFC2459, is hereby incorporated by reference. Alternatively, the certificates may also be verified using Online Certificate Status Protocol (OCSP)

against its issuing Certificate Authority. Details of OCSP are described in IETF RFC2560, which is hereby incorporated by reference.

In block 514, computing device 102n stores the decrypted/validated packets in a local storage device, such as memory 212. In block 516, computing device 102n provides an acknowledgement to intermediate computing device 102b via network 104.

In block 508, computing device 102n, receives and decrypts the trailer manifest from intermediate computing device 102b using encryptor/decryptor module 217.

In block 510 computing device 102n, authenticates the signature of the received trailer manifest. Computing device 102n, upon authentication of the signature transmits an ACK indication (acknowledgement) to intermediate computing device 102b.

In block 518, computing device 102n reads the decrypted/verified manifest to determine the ordered list of unique IDs in the received trailer manifest. Computing device 102n also uses assembler module 221 to reorder and reassemble the portions of the document from the received packets (stored in local storage in block 514) into a document to reconstruct the original document as provided from computing device 102a.

In block 520, computing device 102n using application 220, calculates a crypto hash of the reassembled document. In block 522, computing device 102n validates reassembled document by comparing the calculated crypto hash with the crypto hash found inside the trailer manifest received from computing device 102b. In one implementation, if the document is determined not to be valid, an error is sent to computing device 102a and/or 102b, and an indication of such error may be logged within computing device 102n in block 524. Such error indication may be provided to another computing device via network 104 or signaled to a user using conventional means. If the reassembled document is determined to be valid, an indication may be provided to other processes in computing device 102n that the document was received.

Although the preferred embodiments describe transferring a data packets from computing device 102a to 102n via computing device 102b (FIG. 1), such data packets may be transferred from computing device 102n to computing device 102a using the methods shown in FIGS. 3-5 either directly or via other computing devices, where computing device 102n implements the methods shown in FIG. 3, computing device 102b implements the methods shown in FIG. 4, and computing device 102n implements the methods shown in FIG. 5. Also the process described in this specification discloses translating one data packets between multiple computing devices; the process could further translate multiple data packets, and transmit each of the multiple translated data packets to one or more computing devices from an intermediate computing device such that each of the data packets is translated at the intermediate computing device with a different signing or encryption scheme. Also although computing device 102b is described as the intermediate computing device, any computing device could be substituted for computing device 102b. Further, the processes described with respect to computing devices 102n and 102a could be substituted for the processes described with respect to computing devices 102a and 102n. Thus a document could be transmitted from computing device 102n via computing device 102b to computing device 102a.

Referring to FIG. 6, there is shown an exemplary data packet 602, and a document 604. Data packet 604 includes a session token 606, unique ID of a document portion 608 and a portion 612 of the document 604. Document 604 is comprised of multiple portions 612a-612n which may be of equal or unequal sizes.

An exemplary trailer manifest is shown in block 700 of FIG. 7. Trailer manifest includes session token, packet information comprising Packet unique IDs portions and the original document hash and hash algorithm. Appendix to the packet ID is an indication of the order in the document of While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A method for communicating with an intermediate computing device coupled between a first computing device disposed at a first location and a second computing device disposed at a second location, the method comprising:

receiving via a communications network from the first computing device multiple portions of a document and a trailer manifest, the multiple portions and the trailer manifest being individually signed and encrypted at the first location in accordance with a first signing and a first encryption methodology, the trailer manifest indicating an order for the second computing device to assemble the multiple portions into a document;

decrypting the individual portions of the documents and verifying the signatures of the individual portions of the document using the first signing and encrypting methodology;

decrypting the trailer manifest and verifying the signatures of the trailer manifest using the first signing and encrypting methodology;

re-signing and re-encrypting the individual portions of the decrypted and verified document with a second signing and a second encryption methodology such that the individual portions document can be decrypted and validated at a second location;

re-signing and re-encrypting the decrypted and verified trailer manifest with the second signing and the second encryption methodology such that the trailer manifest can be decrypted and validated at a second location; and transmitting the re-signed and re-encrypted individual portions of the document with the re-signed and re-encrypted trailer manifest to the second computing device via a communications network, the trailer manifest to be used by the second computing device to determine an order to assemble the multiple portions into a document.

2. The method as recited in claim 1, wherein the trailer manifest is created at the first computing device, and wherein the trailer manifest includes at least one of: 1) a packet identification of each of the multiple portions of the document, or 2) an indication of an order of the multiple portions to be assembled in the document, and 3) a hash of each of the multiple portions of the document to authenticate the sender of the multiple portions of the document.

3. The method as recited in claim 2 further comprising providing, in response the intermediate computing device receiving one or more of the multiple portions of the document, an acknowledgement indication to the first computing device from the intermediate computing device that all of the multiple portions of the documents have been successfully received, and an indication which portions of the multiple portions of the multiple portions of the document have not been successfully been received and need to be retransmitted.

4. The method as recited in claim 1, further comprising receiving an encrypted and signed trailer manifest at the intermediate computing device.

5. The method as recited in claim 1 wherein the document is re-encrypted using an algorithm different from the algorithm used to encrypt the document, wherein the intermediate computing device determines the algorithm from a table previously provided by the second computing device to the intermediate computing device and pre-stored in a memory of the intermediate computing device.

6. The method as recited in claim 1 wherein the document is re-encrypted using a key having a different length than the key used to encrypt the document.

7. The method as recited in claim 1 wherein the document is signed by the first computing device and re-signed by the intermediate computing device using a signing digest algorithm, and wherein the signing digest algorithm used to sign the document is different from the signing digest algorithm used to re-sign the document.

8. The method as recited in claim 1 wherein the received document includes a message syntax encoding scheme different from the message syntax encoding scheme of the transmitted document.

9. The method as recited in claim 1 wherein the received document is verified using a trusted Certificate Authority and the transmitted document is encrypted and signed with a key from a different trusted Certificate Authority.

10. The method as recited in claim 1 wherein document received by the intermediate computing device was signed with a hash of the document that was embedded in the document by the first computing device, and wherein the intermediate computing device provides the portions of the document to the second computing device that checks a validity of the document by comparing the embedded hash with a hash of the assembled document computed by the second computing device.

11. An apparatus for transferring a signed and encrypted document via a communications network between a first electronic device disposed at a first location with a second electronic device disposed at a second location, the apparatus comprising:
   a receiver to receive via the communications network multiple portions of the document and a trailer manifest, the multiple portions being individually signed and encrypted at the first location in accordance with a first signing and a first encryption methodology, the trailer manifest indicating an order to assemble the multiple portions of the document;
   a decryptor and a validator to separately decrypt the individual portions of the documents and to verify the signatures of the individual portions of the document using the first signing and encryption methodology;
   a signor and an encryptor to re-sign and re-encrypt the individual portions of the decrypted and verified document with a second signing and a second encryption methodology such that the individual portions document can be decrypted and validated at a second location; and
   a transmitter to transmit via the communications network the re-signed and re-encrypted individual portions of the document with the trailer manifest to the second electronic device that decrypts the re-encrypted individual portions and assembles the decrypted re-encrypted individual portions into a document in accordance with the order specified in the manifest.

12. The apparatus as recited in claim 11 further comprising receiving at the intermediate computing device the trailer manifest created at the first computing device for each the multiple portions of the document, the trailer manifest including at least a packet identification of each of the multiple portions of the document and a hash of each of the multiple portions of the document to authenticate the sender of the multiple portions of the document.

13. The apparatus as recited in claim 12 further comprising a second transmitter to provide, in response to the intermediate computer receiving one or more of the multiple portions of the documents, 1) an acknowledgement indication to the first computing device from the intermediate computing device to indicate that all of the multiple portions of the documents have been successfully received from the first computing device, and 2) an indication to the first computing device which portions of the multiple portions of the multiple portions of the document have not been successfully been received and need to be retransmitted from the first computing device.

14. A non-transitory computer readable storage media having instruction that when executed by a processor disposed at an intermediate computing device comprise the method of:
   receiving via a network from the first computing device 1) multiple packets that each include a portion of a document, and 2) a trailer manifest, the multiple packets being individually signed and encrypted at the first location in accordance with a first signing and a first encryption methodology, the trailer manifest including information indicating an order to assemble portions of the document;
   decrypting the individual packets and verifying the signatures of the individual packets using the first signing and encrypting methodology;
   re-signing and re-encrypting the decrypted and verified packets with a second signing and a second encryption methodology such that the packets can be decrypted and validated at a second location with the second signing and the second encryption methodology; and
   transmitting via the network the re-signed and re-encrypted individual packets and the trailer manifest to the second computing device that decrypts and verifies the re-signed and re-encrypted individual packets and assembles the individual packets into a document in accordance with information included in the trailer manifest.

15. The computer readable storage media as recited in claim 14, wherein the packets are received from the first computing device in a first order, wherein transmitting the re-signed and re-encrypted individual packets to the second computing device via a network comprises:
   transmitting a plurality of the individual packets to the second computing device in a different order than the first order.

16. The computer readable storage media as recited in claim 14 further comprising:
   receiving at the intermediate computing device the trailer manifest that includes at least a packet identification of each of the multiple portions of the document, a session identification and a hash of each of the multiple portions of the document to authenticate the sender of the multiple portions of the document.

17. The computer readable storage media as recited in claim 16 further comprising providing in response to reception of one or more packets by the intermediate computing device 1) an acknowledgement indication to the first computing device from the intermediate computing device that all of the packets have been successfully received, and 2) an indication which packets have not been successfully been received and need to be retransmitted.

18. A system for transferring information between a first electronic device disposed at a first location via a second electronic device to a third electronic device disposed at a third location, the system comprising:
  said first electronic device including:
    a signor and an encryptor to sign and encrypt the individual portions of the decrypted and verified document with a first signing and a first encryption methodology,
    a transmitter operative to transmit to a second electronic device via a network: 1) multiple signed and encrypted individual portions of a document as data packets, and 2) a trailer manifest including information indicating an order to assemble portions of the document;
  said second electronic device disposed at a second location, said second device including:
    a receiver to receive via the network the data packets and trailer manifest;
    a decryptor and a validator to separately decrypt the data packets and to separately verify the signatures of the data packets using the first signing and encrypting methodology;
    a signor and an encryptor to re-sign and re-encrypt the decrypted and verified data packets with a second signing and a second encryption methodology provided by the third electronic device such that the individual portions document can be decrypted and validated with the third electronic device at the third location with the second signing and the second encryption methodology; and
    a transmitter operative to transmit via the network the re-signed and re-encrypted packets and the received trailer manifest to the third electronic device that 1) decrypts and verifies each of the re-signed and re-encrypted data packets, 2) removes the individual portions from the data packets, and 3) assembles the individual portions into a document in accordance with information included in the trailer manifest.

19. The system as recited in claim 18 further comprising the third electronic device including:
  a receiver to receive via the network at the third location multiple packets individually signed and encrypted at the second location in accordance with a second signing and the second encryption methodology; and
  a decryptor and a validator to separately decrypt the received packets and to separately verify the signatures of the received packets using the second signing and encrypting methodology.

* * * * *